United States Patent
Hazelwood et al.

(10) Patent No.: US 10,929,829 B1
(45) Date of Patent: Feb. 23, 2021

(54) USER IDENTIFICATION AND ACCOUNT ACCESS USING GAIT ANALYSIS

(71) Applicant: Amazon Technologies, Inc., Reno, NV (US)

(72) Inventors: William R. Hazelwood, Seattle, WA (US); Neeresh Padmanabhan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 403 days.

(21) Appl. No.: 15/587,259

(22) Filed: May 4, 2017

(51) Int. Cl.
| | |
|---|---|
| *G06Q 20/26* | (2012.01) |
| *G06K 7/14* | (2006.01) |
| *H04N 7/18* | (2006.01) |
| *G06T 7/70* | (2017.01) |
| *G06K 9/46* | (2006.01) |
| *G06T 11/60* | (2006.01) |

(52) U.S. Cl.
CPC .......... *G06Q 20/26* (2013.01); *G06K 7/1413* (2013.01); *G06K 9/4604* (2013.01); *G06T 7/70* (2017.01); *G06T 11/60* (2013.01); *H04N 7/183* (2013.01); *G06T 2207/30196* (2013.01); *G06T 2207/30232* (2013.01)

(58) Field of Classification Search
CPC .......... G06Q 20/26; G06T 7/70; G06T 11/60; G06T 2207/30196; G06T 2207/30231; G06K 7/1413; G06K 9/4604; G06K 9/00335; H04N 7/183
See application file for complete search history.

(56) References Cited

U.S. PATENT DOCUMENTS

| | | | |
|---|---|---|---|
| 9,877,668 B1* | 1/2018 | Sarkar | A61B 5/1121 |
| 10,073,882 B1* | 9/2018 | Gupta | G06F 16/245 |
| 2004/0130620 A1* | 7/2004 | Buehler | G06K 9/32 |
| | | | 348/143 |
| 2011/0134240 A1* | 6/2011 | Anderson | H04W 4/029 |
| | | | 348/143 |

(Continued)

FOREIGN PATENT DOCUMENTS

JP     2016057908 A   *  4/2016

OTHER PUBLICATIONS

Sutheerakul et al., "Application of Unmanned Aerial Vehicles to Pedestrian Traffic Monitoring and Management for Shopping Streets", Jul. 15, 2016, ScienceDirect, World Conference on Transport Research—WCTR 2016, Entire document (Year: 2016).*

*Primary Examiner* — Hani M Kazimi
*Assistant Examiner* — Adam Hilmantel
(74) *Attorney, Agent, or Firm* — Hogan Lovells US LLP

(57) ABSTRACT

The present disclosure provides for identity verification and account association utilizing the gait of a customer. A camera may be used to obtain image data such as video image data that includes a representation of the customer walking. This may occur as the customer approaches, enters, or otherwise walks about the physical location. One or more computer vision and gait recognition techniques can be applied to the image data to generate a gait signature for the customer. The gait signature can be matched to a stored gait signature that is associated with a particular user account, thereby identifying and associating the customer with that particular user account. The user account can be accessed and certain actions performed by or attributed to the customer can trigger certain events in the user account.

20 Claims, 12 Drawing Sheets

(56) References Cited

U.S. PATENT DOCUMENTS

| | | | |
|---|---|---|---|
| 2014/0351082 A1* | 11/2014 | Lowinger | G06Q 30/0633 |
| | | | 705/26.8 |
| 2015/0039458 A1* | 2/2015 | Reid | G06K 9/00771 |
| | | | 705/26.1 |
| 2015/0153906 A1* | 6/2015 | Liao | G06F 16/78 |
| | | | 715/709 |
| 2017/0243058 A1* | 8/2017 | Tan | G06K 9/00348 |
| 2018/0232796 A1* | 8/2018 | Glaser | G06Q 90/20 |
| 2018/0246907 A1* | 8/2018 | Thiel | G01C 21/32 |
| 2018/0260877 A1* | 9/2018 | Li | G07G 1/0045 |
| 2018/0302414 A1* | 10/2018 | Wagner | H04L 63/0861 |

* cited by examiner

USER IDENTIFICATION AND ACCOUNT ACCESS USING GAIT ANALYSIS

BACKGROUND

In an effort to reduce friction in the purchasing or otherwise transactional experience, brick and mortar merchants may integrate e-commerce techniques into their physical locations. This may include automatically accessing and debiting a customer's user account to complete a transaction instead of requiring the customer to perform a traditional "check out" process that may include handing payment to a salesperson and waiting for the transaction to be completed. In order to successfully carry out such an automatic e-commerce transaction in a physical location, the correct user account associated with the customer must be identified and accessed. Conventionally, verification of the link between a customer and a user account largely relies on the customer's possession of a token. This may include a physical token such as a subway card, a credit card, or a personal identification (ID) card, but may also include a data token such as a passcode or barcode. However, this conventional form of verification requires an action by the customer to demonstrate possession of the token, and is thus a remaining source of friction in the transactional experience.

BRIEF DESCRIPTION OF THE DRAWINGS

Various embodiments in accordance with the present disclosure will be described with reference to the drawings, in which.

DETAILED DESCRIPTION

Figure 1A:
FIG. 1A illustrates an example environment in which aspects of various embodiments can be utilized, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in conventional approaches for associating a customer with a user account. Specifically, the present disclosure provides for determining and accessing a user account associated with a customer by utilizing the gait of the customer. In accordance with various embodiments, a person's gait is generally unique to the individual, and thus can serve as a personal identifier for that individual. As discussed further herein, a gait analysis layer can be used in place of or in addition to one or more other identity verification layers, such as barcode scanning, facial recognition, and the like, thereby making customer identification and the association of a customer with the correct user account more seamless and robust.

A camera may be strategically positioned at physical location of interest such as a store or other such location. The camera may be used to obtain image data such as video image data that includes a representation of a customer walking. This may occur as the customer approaches, enters, or otherwise walks about the physical location. One or more computer vision and gait recognition techniques can be applied to the image data to generate a gait signature for the customer, such as a gait energy image (GEI), which is a digital representation of the customer's unique gait. The gait signature can be matched to a stored gait signature that is associated with a particular user account, thereby identifying and associating the customer with that particular user account. The user account can be accessed and certain actions performed by or attributed to the customer can trigger certain events in the user account.

In an embodiment, the stored gait signature can be created through an enrollment process, which can be one of an active enrollment process or a passive enrollment process. In an active enrollment process, for example, a customer may be asked to perform an act of walking for the purpose of capturing image data from which a gait signature can be determined through computer vision and gait recognition techniques. The gait signature can be stored and associated with the customer's user account. For purposes of enrollment and recording the gait signature, the customer may provide an alternative form of identity verification associating the customer with the user account. In a passive enrollment process, for example, a customer may be asked, upon entering a physical location, to provide an alternate form of identity verification associating the customer with a particular user account. As the customer walks or otherwise moves around the physical location, a camera obtains image data that includes a representation of the customer walking. A gait signature can be generated for the customer by applying one or more computer vision and gait recognition techniques to the image data. The gait signature can be stored as being associated with the particular user account to which the customer is associated with. Thereafter, the stored gait signature can be used to associate the customer to the particular user account. In an embodiment of passive enrollment, the stored gait signature may be developed and/or updated over time and generated from a plurality of samples of image data of the customer walking or otherwise moving on different instances, such as over an enrollment period, thereby increasing the fidelity of the stored gait signature.

In accordance with various embodiments, utilizing gait analysis as an identity verification layer can be used alone or among other identity verification layers. In some embodiments, the gait analysis layer can replace the need for a customer to perform the additional action of presenting an identity verification token such as a card or scanning a barcode. In this way, the customer's unique gait serves as the verification token. In certain embodiments, the gait analysis layer can be used in conjunction with a facial recognition layer for added security and accuracy. For example, a situation may arise in which the face of a customer may be obscured to some degree, either by environmental obstructions such as shelves, signage, and other customers, or by accessories such as hats, glasses, and the like. In this example, being able to identify and track a customer by their gait in addition to their face can provide more reliable customer identification and tracking.

In an embodiment, utilizing gait analysis as an identity verification layer can be used to associate a customer in a physical store with an user account associated with that customer such that the customer may select and take items from the physical store and have their user account automatically debited for the cost of the items, thus allowing the customer to leave the store with the items without going through a physical check out process. Specifically, in this application, the customer is associated with their user account using their gait and optionally one or more other identity verification layers. Additional detection techniques can be employed to track certain aspects of the customer's behavior once the customer has been associated with an user account, such as which items the customer picks up or puts down, and ultimately which items the customer takes from the store. For example, a physical action of picking up an item may trigger an event in the user account of adding a digital representation of the item to an electronic shopping cart, and a physical action of putting an item back on a shelf may trigger an event in the user account of removing the digital representation of the item from the electronic shopping cart. When it is detected that the customer has left the store, through computer vision tracking or other sensor methods, the associated user account can be automatically debited for the items in the electronic shopping cart.

As mentioned, conventional checkout processes in physical stores are often a source of friction in the shopping experience, particularly when the checkout process becomes a bottleneck. This can limit the number of transactions that can be made in a given period of time, and may deter customers from completing their purchases. However, this friction is not unique to retailers, but exists for any physical service or location that requires the customer or merchant to perform one or more actions to complete a transaction or identity verification and account association, including libraries, public transportation, private offices, among many diverse others. The technological innovation of the present disclosure relieves this and other unsatisfactory experiences by making the association of a physical customer with the correct user account more seamless and robust. The presently disclosed techniques of associating a user in a physical location with an user account through gait analysis as an identity verification layer can be advantageous in numerous applications, some non-limiting examples of which will be described further herein.

Figure 1B:
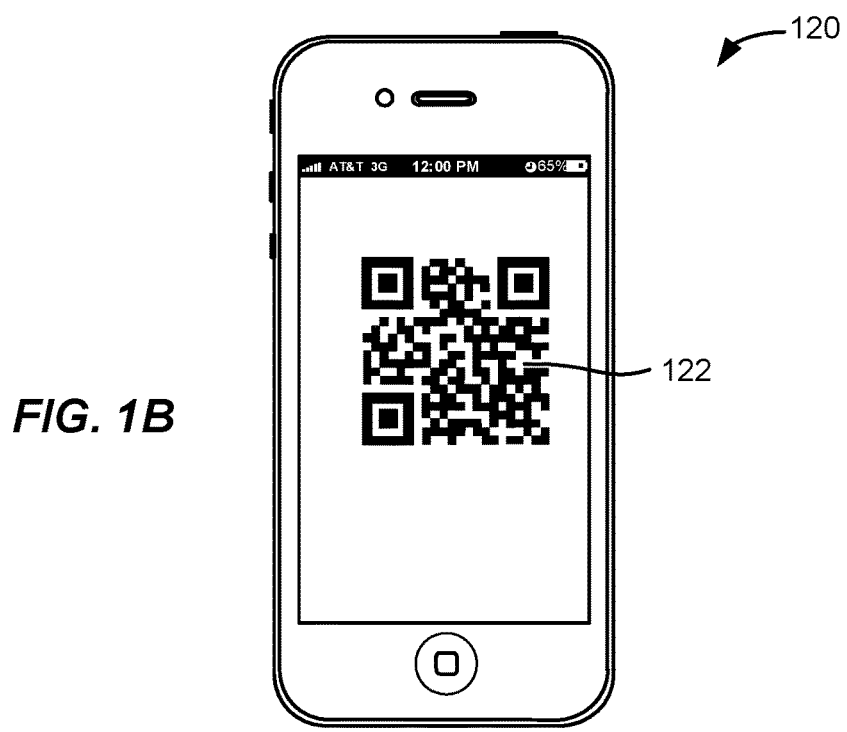
FIG. 1B illustrates an example device used in an example scenario.

FIG. 1A illustrates an example environment 100 in which aspects of various embodiments can be utilized. As mentioned, brick and mortar merchants such as store 102 may integrate e-commerce techniques into their physical locations in order to provide a better shopping experience for customers. Although merchants have been able to improve the transactional experience through improved processes and by leveraging advancements in technology, customers may still be required to perform the action of demonstrating possession of an identity verification token, whether it be a physical token such as a card or ID, or a data token such as a passcode, barcode, or the like. Thus, the transactional experience remains less than seamless. For example, as shown in FIG. 1A, a user 106 can be seen entering a store 102 through entrance 104. As the user 106 enters the store 102, the user 106 may be prompted to verify their identity in order to be associated to a user account. In this example, the user may be prompted to scan a QR code 122 (FIG. 1B) on a kiosk 108 located near the entrance 104. As shown in FIG. 1B, the QR code 122 may be generated on the user's smartphone 120. In some embodiments, in lieu of the smartphone 120, the user may use another type of device, including a tablet, a notebook computer, a smart watch, an electronic wearable device, and the like. The kiosk 108 may include a scanner that reads the QR code 122 and a processor that associates the QR code 122 with a stored user account, thereby associating the user 106 with the user account. It should be appreciated that the QR code 122 is one example of many types of identity verification tokens that can be presented by the user 106 to verify the user identity and the associated user account. For example, the user 106 could alternatively present a bar code or other form of data token on their smartphone 120, a radio frequency identification (RFID) card, a near field communication (NFC) card, or the like, at the kiosk 108 to the same effect. The kiosk 108 may include the appropriate type of sensor to receive the data stored on or represented by the respective token type. For example, the kiosk 108 may include a barcode scanner, a camera, an RFID or NFC reader, or the like. However, requiring the user 106 to present such a token in order to associate the user 106 to a user account may be a source of inconvenience for the user 106. For example, it may take time for the user 106 to locate the token in their bag, or the user 106 may be using their smartphone 120 for another purpose at that moment. Even worse, the user 106 may have misplaced or forgotten to bring the token with them. As another example, some public transportation providers have adopted the use of contactless smart cards, in which such a contactless smart card is associated with a user account. When a user enters a service stop or boards a service vehicle, the user may present the contactless smart card rather than having to use cash or purchase a ticket, and the user account is automatically debited the proper amount for the ride. As illustrated through these examples, although merchants have been able to improve the transactional experience, there still remains the inconvenience of requiring the user to possess and present an identity verification token.

Accordingly, in accordance with various embodiments, approaches provide for identity verification and user account association by utilizing the gait of a user. Gait refers to a person's walking pattern or characteristics. The act of walking typically involves a combination of synchronized movements from almost all major body parts. A person's gait may be influenced at least in part by the structure of these and other body parts, such as size, structure, distance between various body parts, joint structure, general posture and placement dispositions, among many others. Additionally, psychological factors, personality factors, and health factors may further influence a person's gait. Thus, a person's gait may be determined at least in part by a unique combination a large number of personal characteristics that would unlikely be replicable. As such, gait is generally unique to each individual, and can serve as a reliable personal identifier, analogous to a fingerprint. Gait may be characterized by hundreds of spatial and kinematic parameters, such as stride length, height, motion frame size, cadence, arm swing, angular velocities and accelerations at certain joints and body parts, among many others. However, in some embodiments, a relevant subset of such parameters may be enough to uniquely define a person's gait.

Utilizing a person's gait as an identity verification token for identity verification provides a distinct advantage over conventional methods because a person's gait can be verified passively, without requiring the person to perform any additional actions to demonstrate possession of the identity verification token, since the person will generally already be walking in the application environments of the present disclosure.

FIGS. 2A-2D illustrate example scenarios of utilizing gait analysis as identity verification and account association in a shopping application, in accordance with various embodiments. In this embodiment, gait analysis as an identity verification layer can be used to associate a customer in a location such as a physical store with an user account associated with that customer such that the customer may select and take items from the store and have their user account automatically debited for the cost of the items, thus allowing the customer to leave the store with the items without going through a physical check out process. Although the example shown is a store, in accordance with various embodiments, the location can be any kind of physical location of interest, such office building, a public transportation location, a theme park, a school, a land region, among many diverse others.

Figure 2A:
FIGS. 2A-2D illustrate aspects of an example scenario of utilizing gait analysis as identity verification in a shopping application, in accordance with various embodiments.
Figure 2B:
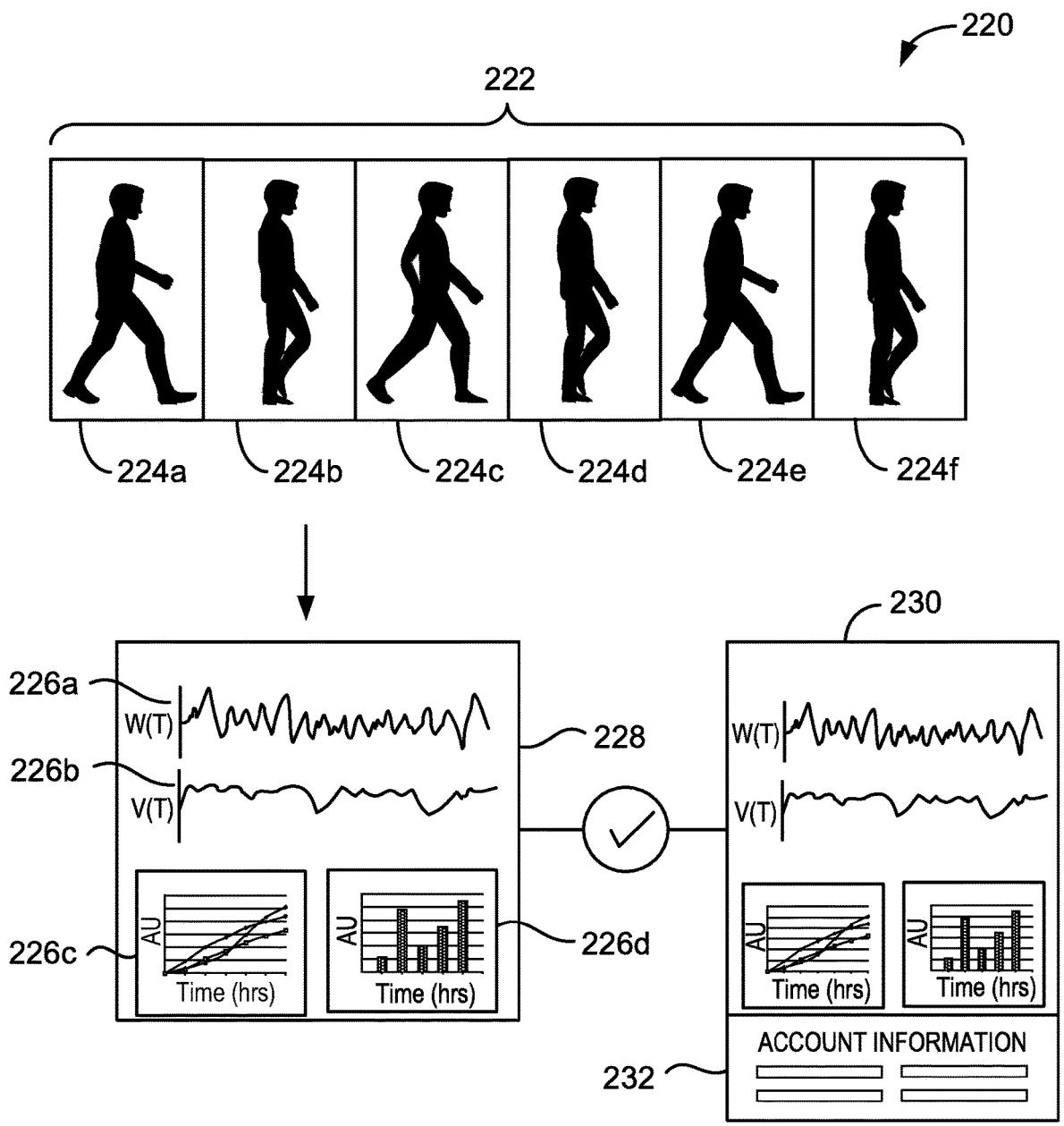
Figure 2C:
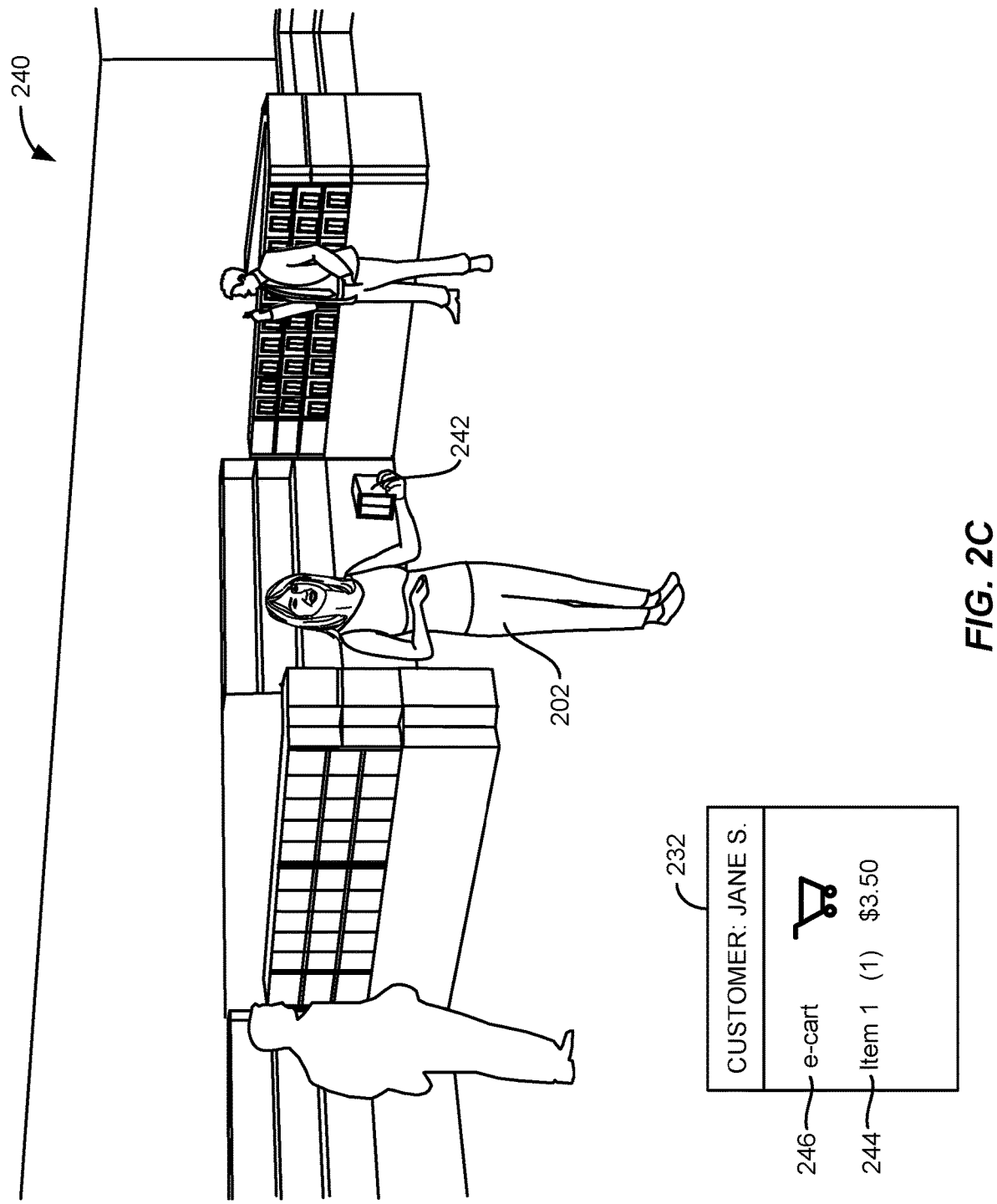
Figure 2D:
Figure 2D:
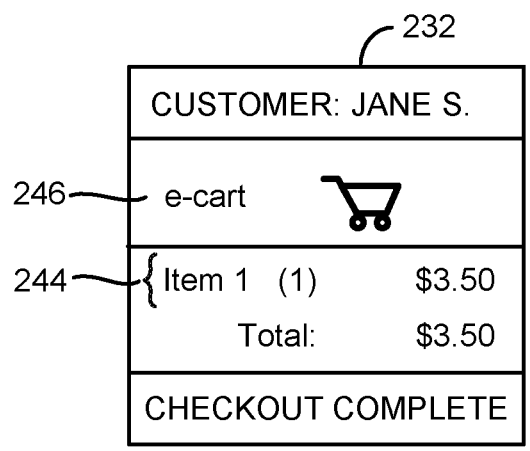

As illustrated in the example scenario 200 of FIG. 2A, a customer 202 is shown walking into a store 204, which may be defined as the customer 202 passing a certain checkpoint such as door 206. Camera 208 may capture a live camera view 210 of the customer 202 walking past the checkpoint. As illustrated in the example scenario 220 of FIG. 2B, image data 222 may be obtained from the live camera view 210 and be used to generate a detected gait signature 228 of the customer 202. In an embodiment, the image data 222 may include a series of frames 224a-224f representing different points in the customer's walk. Although illustrated herein as a 2-dimensional visual image for illustrative purposes, it should be understood that the computer-readable image data 222 may be processed and used as described in its numerical representation without being rendered as a visual image. In an embodiment, one or a plurality of computer vision and gait recognition techniques may be applied to the image data 222 to extract one or a plurality of gait features 226a, 226b, and 226c ("226"). The extracted gait features 226 may include stride length, height, motion frame size, cadence, arm swing, angular velocities and accelerations at certain joints and body parts, among many others, as will be appreciated by one skilled in the art. The combination of gait features 226 creates a detected gait signature 228 associated with the customer 202. The detected gait signature 228 may be matched with a stored gait signature 230 in a database. The stored gait signature 230 is associated with an identity and/or a user account 232. The customer 202 can then associated with the user account 232 upon the detected gait signature 228 matching the stored gait signature 230. Thus, the customer is identified through gait analysis. In some embodiments, gait analysis can be used to identify a customer at any point during a shopping session. For example, a customer may be identified by their gait while the walking around the store. It may be the case that a customer is initially identified when they enter, either by their gait or another identification means, but the identity of the user is lost at some point during the shopping session. At this point, the customer's gait can be analyzed to seamlessly re-identify the customer.

Once the user account 232 has been associated with the customer 202, access to the user account 232 may enabled such that certain actions performed by the customer 202 may trigger corresponding events in the user account 232. For example, continuing with the present example, as illustrated in the example scenario 240 of FIG. 2C, the physical action performed by the customer 202 of picking up a specific item 242 for sale may trigger an event in the user account 232 of adding a digital representation 244 of the item 242 to an electronic shopping cart 246. In an embodiment, a physical action of putting an item back on a shelf may trigger an event in the user account of removing the digital representation of the item from the electronic shopping cart. As illustrated in the example scenario 260 of FIG. 2D, when it is detected that the customer 202 has left the store 204, through computer vision tracking or other sensor methods, the associated user account 232 can be automatically debited for the digital item 244 in the electronic shopping cart 246, completing the purchasing transaction. In an embodiment, debiting the user account 232 may include charging a credit card associated with the user account 232 or debiting a bank account associated with the user account 232. In another embodiment, debiting the user account 232 may include reducing certain a number of points or credits associated with the user account 232.

In some embodiments, the above mentioned user actions performed by the customer may be detected using various systems and associated methods. Such systems are broadly classified herein as user activity tracker. A user activity tracker may detect certain behavior and user actions performed by a user, such as customer 202. Possible user actions may include moving about a location, entering or exiting a location, picking up or putting down an items for consumption (e.g., for purchase, rent, etc.), among others. The user activity tracker may include various cameras and/or other sensors and related software that enable such detection. In an embodiment, the user activity tracker may include the camera 208 used for gait analysis and/or may utilize the image data 222 obtained from the camera 208. In some embodiments, in order to trigger an event in a user account, the detected user action needs to be associated with the user account. This may be achieved through a mutual identifier, in which the mutual identifier is associated with the detected gait signature and also associated with the detected user action. The detected gait signature is matched with the stored gait signature which is associated with user account. Thus, the detected user action is associated with the user account, and the corresponding event can be triggered in the user account. For example, a computer vision technique, such as facial recognition, can be applied to the image data from which the gait signature was derived, to determine an identifier, such as a facial recognition identifier known as a faceprint (i.e., a combination of various machine detected facial landmarks). The user activity tracker may use similar computer vision techniques to obtain a matching identifier, such as the faceprint, and thereby associate the detected user action with the user account. In an embodiment, using computer vision techniques to determine an identifier may include analyzing the image data to determine a feature vector associated with the user, comparing the feature vector to a plurality of stored feature vectors, and determining a stored feature vector from the plurality of stored feature vectors that matches the feature vector to at least a threshold deviation, the stored feature vector associated with the identifier.

In an embodiment, identity verification and account association does not have be occur as the customer enters the store, as illustrated in the above example, but may occur at any time during the customer's stay in the store. In such an embodiment. The activity tracker may track and log the customer's activity as soon as the customer enters the store even if the identity of the customer is undetermined and the customer is not associated with an account. Whenever the customer is identified, and the user account is associated, the previously logged actions can be associated with the user account. For example, a certain amount of footage of the customer walking may be required to make an identity verification and account association. The customer may pick up items during this period, which are being tracked by the user activity tracker as associated with an unidentified customer. Whenever enough gait data has been obtained for identity verification and to make a user account association, the previously logged user actions trigger the corresponding events in the user account.

Figure 3:
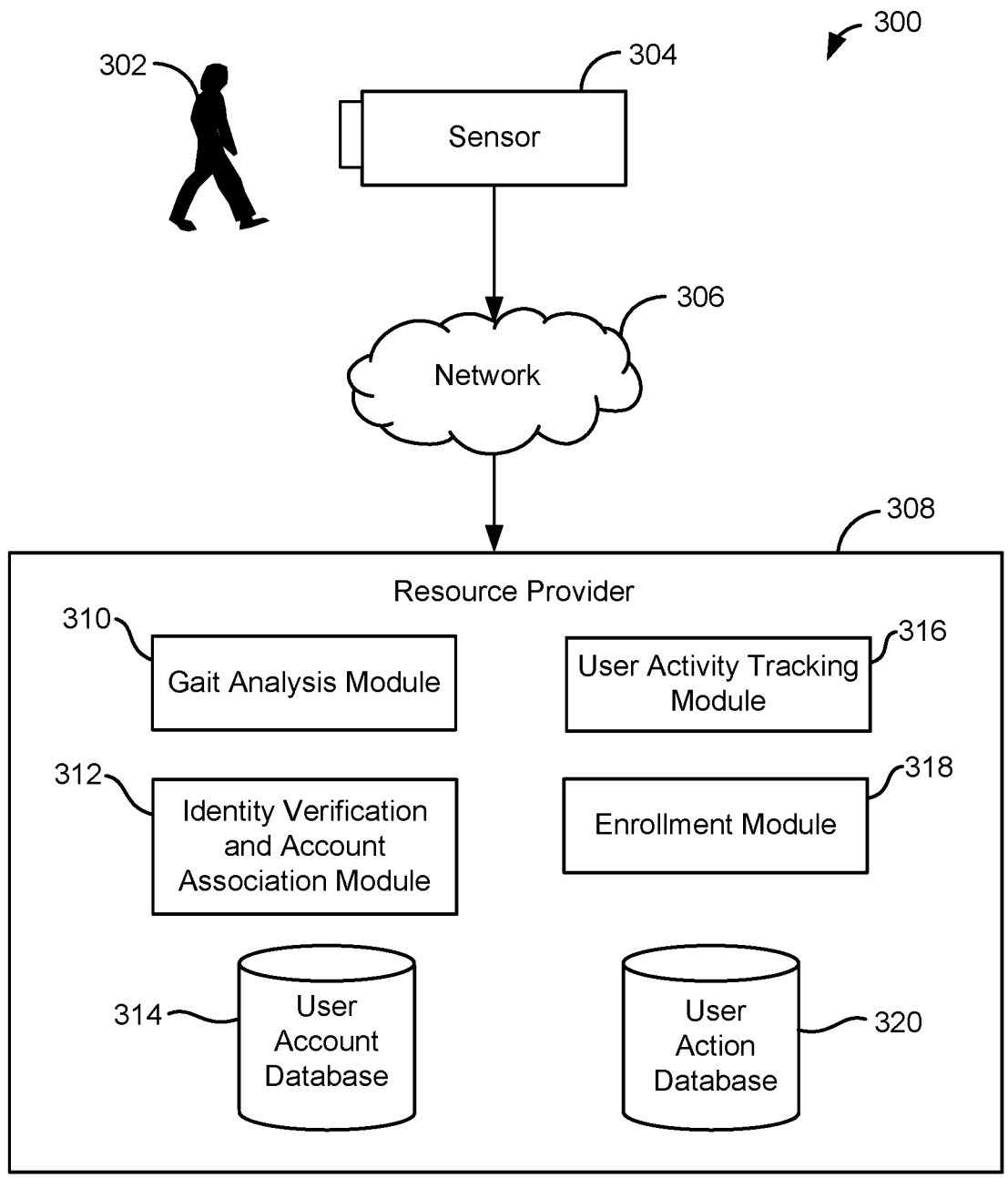
FIG. 3 illustrates a block diagram of an example system implementation for identity verification and account association using gait analysis, in accordance with various embodiments.

FIG. 3 illustrates block diagram of an example system implementation 300 for identity verification and account association using gait analysis, in accordance with various embodiments. The system 300 includes a sensor 304 and a resource provider 308 that communicate through a network 306. It should be noted that additional services, providers, and/or components can be included in such a system, and although some of the services, providers, and components, are illustrated as being separate entities and/or components, the illustrated arrangement is provided as an example arrangement and other arrangements as known to one skilled in the art are contemplated by the embodiments described herein. The sensor 304 is capable of outputting data that includes a representation of a user 302 walking, from which a detected gait signature associated with the user 302 can be determined. In some embodiments, a movement signature can be detected instead of a gait signature, in which the movement signature includes a representation of the user's movements. A movement signature may be the same as, different from, or have commonalities with, the gait signature. The sensor 304 may include a camera such as a conventional still camera, video camera, satellite imaging device, a low resolution camera, a high resolution camera, among others. In some embodiments, the sensor 304 may include a camera that detects a visible portion of the electromagnetic spectrum or other portions of the electromagnetic spectrum such as an infrared portion. The sensor 304 may include a camera that has a frame rate at least twice the rate of the walking frequency of the user 302. In some embodiments, the sensor 304 may include a motion sensing device, such as motion sensors operating on infrared sensing, radio frequency sensing, light sensing, sound and vibrational sensing, magnetic sensing, among other sensor types, or a combination thereof. The sensor 304 may be strategically positioned at or near a location of interest such as a store, an office building, a subway station, or other such location. The sensor 304 may be located local to or remote from the resource provider 308. The sensor 304 may be used to obtain sensor data that includes a representation of the user 302 walking. This may occur as the user 302 approaches, enters, or otherwise walks about the location.

The network 306 can include any appropriate network, such as the Internet, a local area network (LAN), a cellular network, an Ethernet, Wi-Fi, Bluetooth, radiofrequency, or other such wired and/or wireless network.

The resource provider 308 obtains the sensor data from the sensor 304 and performs the various computing tasks related to associating the user 302 with an user account and triggering events in the user account based on user actions performed by the user 302. In an embodiment, the resource provider 308 includes a gait analysis module 310, an identity verification and account association module 312, a user account database 314, a user activity tracking module 316, an enrollment module 318, and a user action database 320.

In an embodiment, the gait analysis module 310 received the sensor data generated by the sensor 304 and determines a detected gait signature of the user 302 from the sensor data. The sensor data may have undergone pre-processing by an optional pre-processing module (not shown) before being received by the gait analysis module 310. The pre-processor module may prepare the sensor data, which may be raw sensor data, for use by the gait analysis module 310 or other forms of analysis that may be conducted on the sensor data, such as facial recognition, among others. For example, in an embodiment in which the sensor data is image data, the pre-processing module may perform image processing such as frame selection, cropping, background removal, image contrast enhancement, among various other adjustments to the image data. In an embodiment, the pre-processing module may isolate or extract a representation of only the user from the image data. Such pre-processing tasks may be performed according to predetermined steps (i.e., batch processing) or on the fly based on a defined criteria.

The gait analysis module 310 may receive the pre-processed sensor data or raw sensor data, and determine a detected gait signature therefrom. In an embodiment, the gait analysis module 310 may perform all the functions described above with respect to the pre-processing module. In an embodiment, the gait analysis module 310 may further process the sensor data in order to extract the gait features that make up the detected gait signature. The gait analysis module 310 applies one or more gait analysis techniques to extract one or more gait features from the sensor data, non-limiting example of which include stride length, height, motion frame size, cadence, arm swing, angular velocities and accelerations at certain joints and body parts, among many others. One or more computer vision and gait recognition techniques can be applied to the image data to generate a gait signature for the user 302, such as a gait energy image (GEI), which is a digital representation of the customer's unique gait. The gait analysis module 310 combines these extracted features to generate the detected gait signature.

The account database 314 contains one or more user accounts, each of which is defined by a set of associated data. The set of associated data for one user account may include a name, an address, an email, a phone number, a payment method, a stored gait signature, among other such information. In an embodiment, the stored gait signature is associated with the user account through an enrollment process conducted by the enrollment module, as will be discussed further herein.

The identity verification and account association module 312 uses the detected gait signature generated by the gait analysis module to verify the identity of the user and/or to associate a user account with the user 302. Specifically, the identity verification and account association module 312 matches the detected gait signature to a stored gait signature in the account database 314. Various matching algorithms such as data matching algorithms, line matching algorithms, etc. can be utilized to compare gait signatures. The detected gait signature may be considered to "match" a stored gait signature if the detected gait signature matches the stored gait signature within a predefined error margin or threshold. For example, in an embodiment, the detected gait signature may be considered to match a stored gait signature if the detected gait signature matches the stored gait signature at 96%. In another example, the detected gait signature can be associated with a highest matching or confidence score. In an embodiment, the detected gait signature may be compared to a plurality of stored gait signature until a match is detected. Upon determining a match, the user account associated with the stored signature is associated with the user 302, and access to the user account is enabled.

The user activity tracking module 316 determines certain user actions performed by the user 302. The user activity tracking module 316 may receive as inputs data from one or more detection systems, which may include various cameras and/or other sensors that collect data representing the user actions. In an embodiment, the user activity tracking system may include the sensor 304 used for gait analysis or may utilize the sensor data obtained from the sensor 304. The user activity tracking module 316 receives the data from the detection systems and determines the user actions from the data. In an embodiment, the data is image data. User activity tracking module 316 may apply one or more computer vision techniques to the data to recognize an item and the user's interaction with the item, for example, if the user picked up the item or put the item in a bag. In another embodiment, the activity tracking module 316 may determine a user's location by tracking the user's path since passing a checkpoint or by determining the user's proximity to certain checkpoints. In an embodiment, the user actions determined by the user activity tracking module 316 may be based on a predefined list of possible user actions and the expected sensor data that correspond to each of the possible user actions. In some other embodiments, there may not be a predefined finite list of user actions, but rather a set of rules for determining a user action on the fly. The rules may be predefined or created and refined by the user activity tracking through various machine learning techniques. In either case, the user activity tracker module 316 also determines the event to be triggered in the user account that corresponds with the detected user action, and initiates the event in the user account that has been associated with the user 302 and for which access has been enabled.

In an embodiment, the user action database 320 contains a defined list of possible user actions and the corresponding event to trigger in the user account. For example, in a shopping application, the user action database 320 may contain a list of all the items for consumption in a store. Each item is associated with the expected sensor data that indicates whether a user has picked up or put down the item, as well as a digital representation of the item, including item information and price, and the event to trigger in the user account upon detection of whether a user has picked up or put down the item. In this example, the event to trigger may be adding the digital representation of the item to an electronic shopping cart or removing the digital representation of the item from the electronic shopping cart. The user action tracking module 320 may accesses the user action database to determine the event to trigger upon detecting a user action.

The enrollment module 318 creates the stored gait signature associated with a user account in the account database. The enrollment module 318 associated the user with a user account through an alternate identity verification token, which may occur as a part of an enrollment process. The alternate identity verification token may include the user a physical token such as a card or a data token such as a barcode. The enrollment module 318 may obtain image data of the user walking and generate a gait signature from the image data. In an embodiment, the enrollment module may utilize resources from the gait analysis module 310. The gait signature can be stored as being associated with the user account. Thereafter, the stored gait signature can be used to associate the user 302 to the user account.

The resource provider 308 may include additional modules for carrying out various other optional functionality. One or more of the modules and databases described above may be implemented jointly or separated further into additional modules. In some embodiments, the resource provider 308 may be implemented on a computing device or a network of server computing devices that includes one or more processors and one or more memory which may contain software applications executed by the processors. The features and services provided by the resource provider 308 may be implemented as a web services consumable via a communication network. In further embodiments, the resource provider 308 can be provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In an embodiment, a merchant can set up the sensor 302 in their physical store or location, and sensor data of users can be sent to the resource provider 308. The merchant may be classified as a client. The resource provider 308 may performs the user identity verification and user account associate remotely from the merchant. The resource provider 308 may serve the associated user account information back to the merchant once the association has been established, and the merchant may trigger events in the user account accordingly. In another embodiment, the resource provider may administer the user account and trigger events in the user account accordingly.

Figure 4:
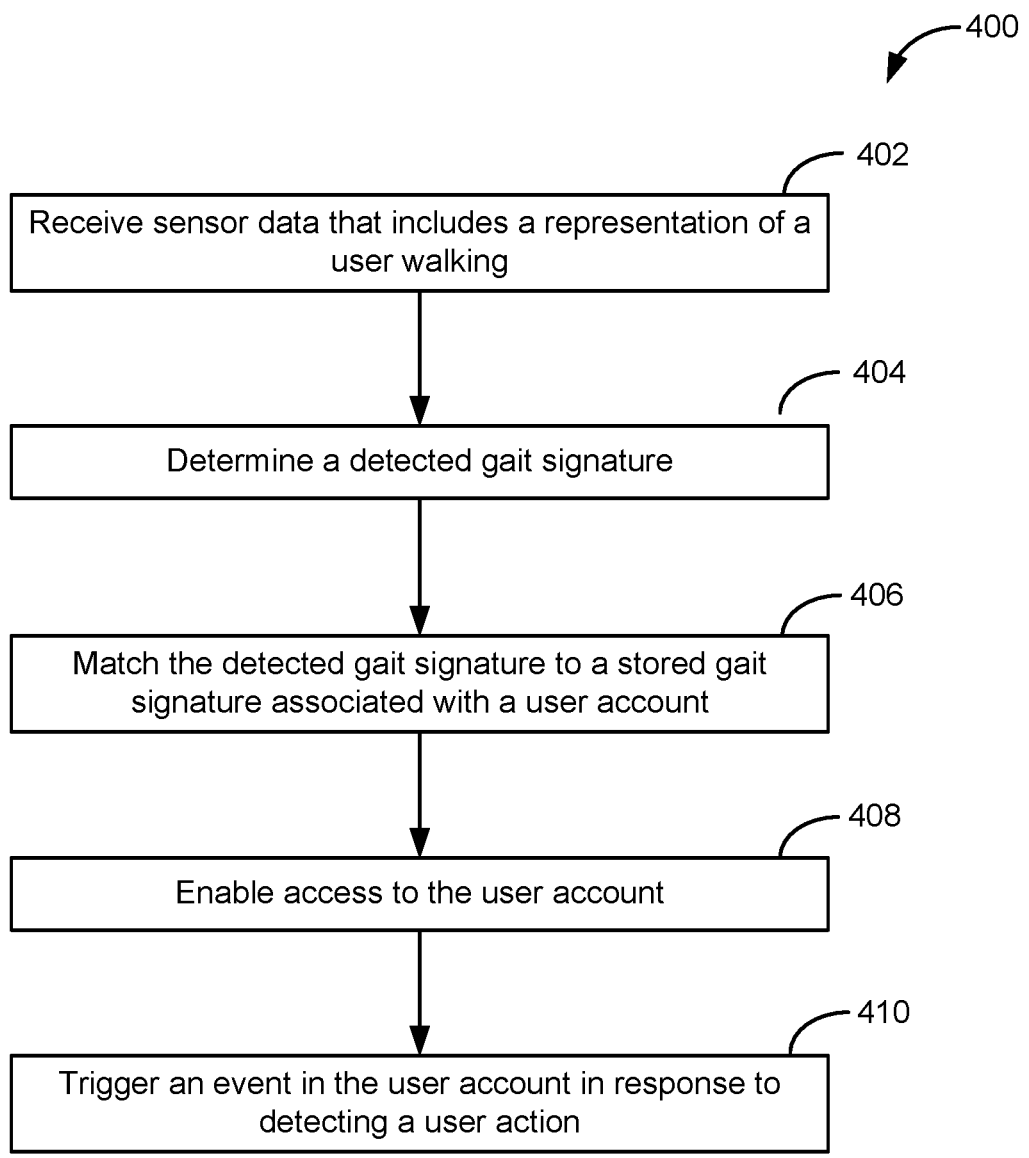
FIG. 4 illustrates an example process for identity verification and account association using gait analysis, in accordance with various embodiments.

FIG. 4 illustrates an example process 400 for using gait or movement analysis for identity verification and account association, in accordance with various embodiments. In an embodiment, the process 400 may be executed by the resource provider of FIG. 3. It should be understood that, for any process discussed herein, there can be additional, fewer, or alternative steps performed in similar or alternative orders, or in parallel, within the scope of the various embodiments unless otherwise stated. In this example, sensor data is received 402, in which the sensor data includes a representation of a user walking. The sensor data may be output from a sensor such as a camera. A gait or movement recognition technique may be applied to the sensor data to determine a detected gait or movement signature for the user 404. The detected gait or movement signature may be matched to a stored gait or movement signature stored in a database within a predetermined error margin 406, thereby identifying the user through their gait. The stored gait or movement signature is associated with a user account. Access to the user account is enabled in response to matching the detected gait or movement signature with the stored gait or movement signature within the predetermined error margin 408. In some embodiments, the association between the user and the user account may be additionally verified through an alternate identity verification token in order to enable access to the user account. Upon enabling access to the user account, an event may be triggered 410 in the user account in response to detecting a user action performed by the user. In some embodiments, the user action may include the user entering or exiting a specified location or boundary, picking up or putting back an item for consumption, among others. The event triggered in the user account may include logging the user action, debiting the user account an amount associated with the user action, or producing a notification corresponding to the user action. In an embodiment, for example, a shopping application, the detected user action may include the user leaving a store with an item for sale and the event triggered in the user account may include debiting the user account for an amount associated with purchasing the item for sale.

In an embodiment, the sensor data that may be received that includes a representation of a secondary user associated with a primary user (previously referred to as "the user") or the user account, and an event can be triggered in the user account in response to detecting a secondary user action. In an example, the secondary user can be associated with the primary user through spatial and temporal proximity, such as entering the location together, and remaining within a certain spatial proximity for a certain duration. In an embodiment, the secondary user and the primary user may perform a certain action to indicate association, such as holding hands, standing together at specified spots within a defined region, or other predefine visual signal. Upon doing so, the primary user and the secondary user are both associated with the user account and can be tracked independently, and user actions performed by either user can trigger events in the user account.

The presently disclosed techniques for using gait analysis for identity verification and account association, such as described with respect to example process 400, can be advantageous in numerous applications, in addition to the example shopping application illustrated in FIGS. 2A-2D. In an embodiment, utilizing gait analysis for identity verification and account association can be used to facilitate the public transportation experience. For example, a passenger of a public transportation vehicle, such as a subway or bus, can be associated with an user account through their gait such that the passenger can embark and disembark the vehicle and have the proper fare be deducted or debited from the account without needing to present any type of token, including any smart cards or tickets. Specifically, in this example, image data of the passenger walking towards, walking onto or walking within, a certain public transportation vehicle may be obtained, and a detected gait signature generated therefrom. The detected gait signature is matched to a stored gait signature associated with a user account, and the passenger is associated with the user account. The time and location of when the passenger embarks and disembarks from the vehicle, as well as the vehicle ID, may be data used to determine the user action. The user action then triggers a corresponding event in the user account. In this example, event may be deducting or debiting a fare amount from the user account.

Figure 5:
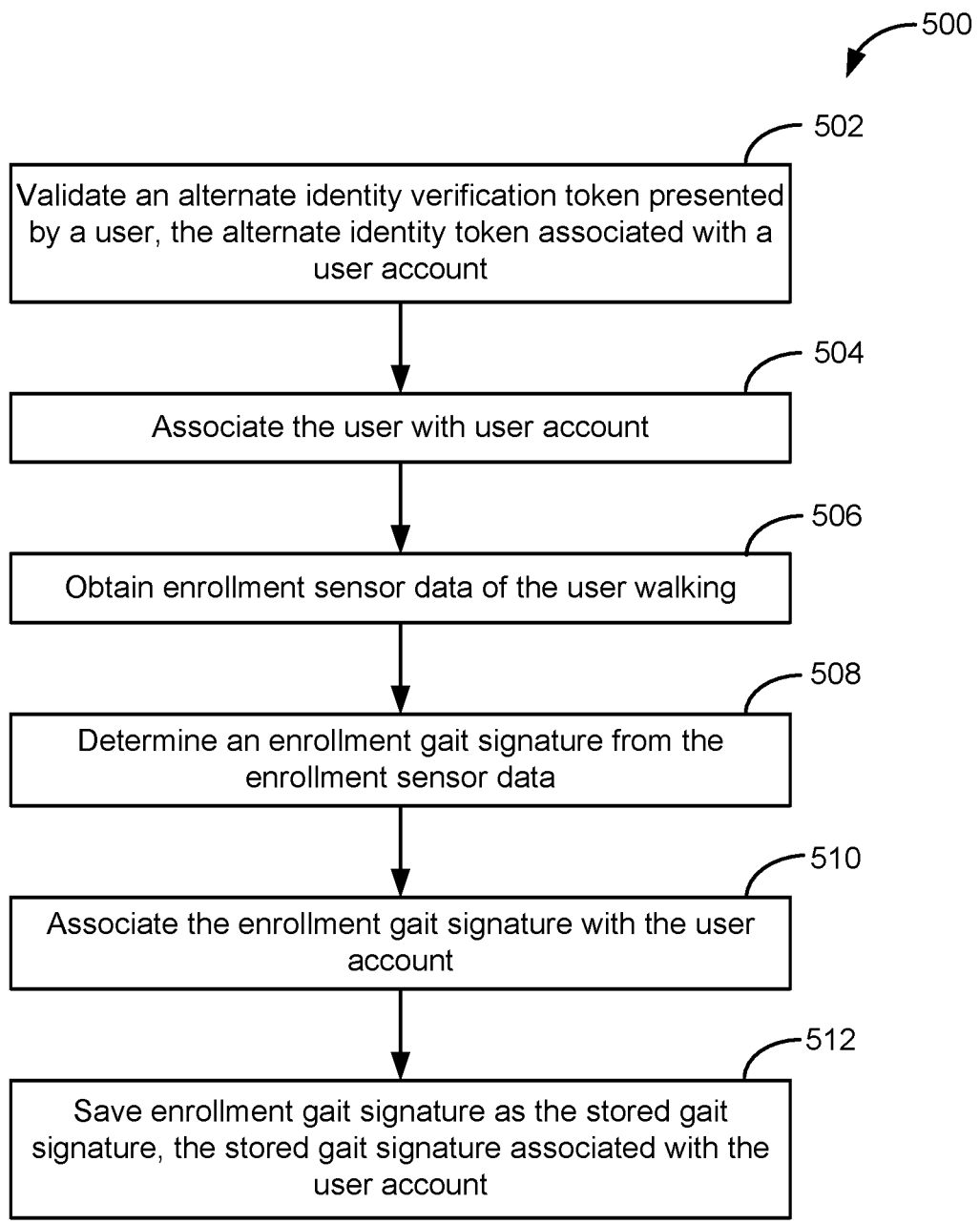
FIG. 5 illustrates an example enrollment process for creating a stored gait signature associated with a user account, in accordance with various embodiments.

FIG. 5 illustrates an enrollment process 500 for creating a stored gait signature associated with a user account. In an embodiment, the process 500 may be executed wholly or in part by the resource provider of FIG. 3. In an embodiment, for purposes of enrollment and creating the stored gait signature, a user may be prompted to provide an alternate verification token, such as a card, an ID, or a barcode. The alternate verification token may be validated as being associated with a user account 502. The user is thus associated with the user account 504. Enrollment sensor data is obtained and includes a representation of the user walking 506. In an embodiment, the enrollment sensor data may be image data generated by a camera recording the user walking. In an embodiment, the enrollment sensor data may be obtained through an active process, in which the user is asked to walk a certain distance for the purpose of capturing the enrollment sensor data. In another embodiment, the enrollment sensor data may be obtained through a passive process, in which the customer walks as they normally would (e.g., walking around a store as the user shops), and enrollment sensor data is generated from this walk. In either case, an enrollment gait signature can be determined from the enrollment sensor data 508 by applying one or more computer vision and gait recognition techniques to the sensor data. The enrollment gait signature is then associated with the user account to which the user was associated via the alternate verification token 510. The enrollment gait signature may be saved as the stored gait signature 512, the stored gait signature being associated with the user account.

In an embodiment, the stored gait signature may be continuously developed and/or updated over time as more detected gait signatures are recorded as being associated with the user account. Additionally, gait as an identity verification token may be used to validate and refine other forms of identity verification, and other forms of identity verification can be used to validate and refine the stored gait signature. In an embodiment, the same stored gait signature may be used in multiple locations in which the user account may be accessed. Additionally, the same stored gait signature may be associated with multiple user accounts without requiring separate enrollment processes. For example, the same stored gait signature may be associated with a particular merchant account, a public transportation account, among others. In such instances, the stored gait signature may be called a universal gait signature.

Figure 6:
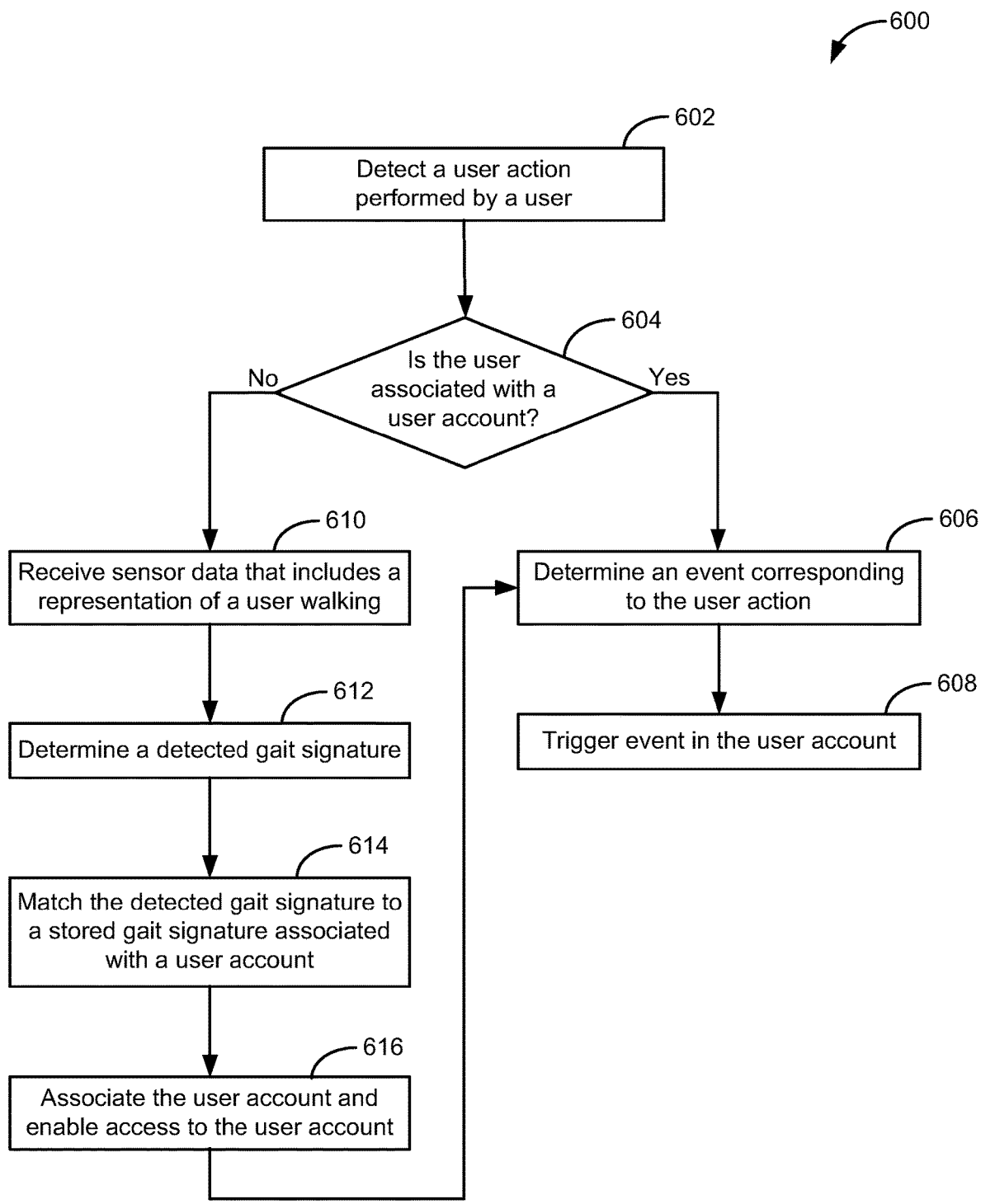
FIG. 6 illustrates an example process for triggering an event in a user account corresponding to a user action, in accordance with various embodiments.

FIG. 6 illustrates an example process 600 for triggering an event in a user account corresponding to a user action, in accordance with example embodiments. In an embodiment, the process 600 may be executed wholly or in part by the resource provider of FIG. 3. In this example, a user action is detected 602. The user action may be one of a plurality of predefined possible user actions such as picking up or putting down a specific item, or entering or exiting a specified location or boundary. In order to trigger an event in a user account for the detected action, the user account may need to be associated with user performing the action. Thus, a determination 604 is made as to whether the user that performed the detected user action is associated with a user account. If the user is indeed associated with a user account and the account is enabled for triggering an event therein, then an event corresponding to the detected user action is determined 606 and the event can be triggered in the associated user account 608. If the user is not associated with a user account, then identity verification and account association using gait analysis is initiated, in which sensor data that includes a representation of the user walking is received 610, a gait recognition algorithm is applied to the sensor data to determine a detected gait signature for the user from the sensor data 612, the detected gait signature is matched to a stored gait signature associated with a user account within a predetermined error margin 614, and the user is associated with the user account. Access to the user account is thereby enabled. Upon associating the user with the user account and enabling access to the user account, then an event corresponding to the detected user action is determined 606 and the event can be triggered in the associated user account 608. In an embodiment, the process

600 may run continuously such that a user can be re-associated with the user account if the association was lost at any point.

In accordance with various embodiments, utilizing gait analysis as an identity verification layer can be used alone or among other identity verification layers. In some embodiments, the gait analysis layer can replace the need for a user to perform the additional action of presenting an identity verification token such as a card or scanning a barcode. In this way, the customer's unique gait serves as the identification verification token. In certain embodiments, the gait analysis as an identity verification layer can be used in conjunction with a facial recognition layer for added security and accuracy. For example, a situation may arise in which the face of a customer may be obscured to some degree, either by environmental obstructions such as shelves, signage, and other customers, or by accessories such as hats, glasses, and the like. In this example, being able to identify and track a customer by their gait in addition to their face can provide more reliable customer identification and tracking.

In some embodiments, gait analysis can be used as a secondary identity verification layer or as an identity recovery layer. For example, a user may be prompted to present an initial identity verification token such as a card or a barcode upon entering a location such as a store. The user is associated with a user account via the identity verification token. As the user moves about the location, a confusion event may occur in which the verified identity of the user is lost and the user becomes unassociated with the user account. In other to re-associate the user with the user account, identity verification and account association using gait analysis may be performed, without requiring the user to present the initial identity verification token again or perform any additional action. The user may not ever become aware of the confusion event. An example confusion event could be an event in which a plurality of users come into very close proximity with each other and at an odd angle to tracking sensors such that the tracking sensors lose track of one or more of the plurality users.

Figure 7:
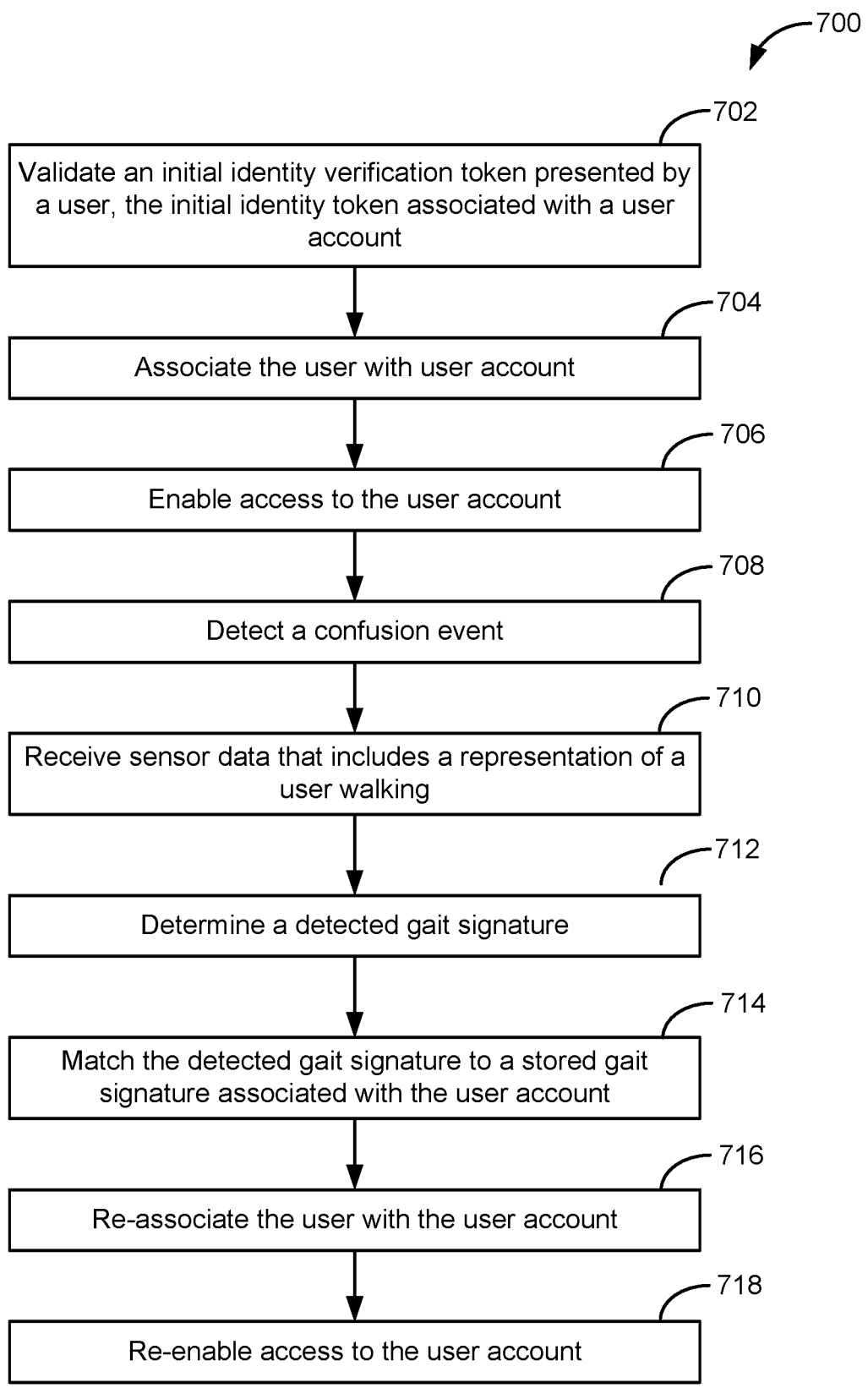
FIG. 7 illustrates an example process of re-associating a user with a user account using gait analysis, in accordance with various embodiments.

FIG. 7 illustrates an example process of re-associating a user with a user account using gait analysis, in accordance with example embodiments. In an embodiment, the process 700 may be executed wholly or in part by the resource provider of FIG. 3. In this example, a user may be prompted to present an initial identity verification token such as a card or a barcode in order verify their identity and be associated with a user account. The initial identity verification token presented by the user is validated 702, and the user is associated with a user account that is associated with the initial identity verification token 704. Access to the user account is enabled 706 as a result of the validation. At some point, such as when the user is moving about the location, a confusion event may be detected 708, in which the previously verified identity of the user is lost and the user becomes unassociated with the user account. Upon the occurrence of a confusion event, identity verification and account re-association using gait analysis is initiated, in which sensor data that includes a representation of the user walking is received 710, a gait recognition algorithm is applied to the sensor data to determine a detected gait signature for the user from the sensor data 712, the detected gait signature is matched to a stored gait signature associated with a user account within a predetermined error margin 714, and the user is re-associated with the user account 716, and access to the user account is re-enabled 718. In an embodiment of this process 700, when matching the detected gait signature to a stored gait signature, the search scope may be limited to only stored gait signatures associated with user account that were recently active (e.g., associated, enabled). This may reduce the amount of sensor data needed to generate an adequate detected gait signature, reduce the number features that need to extracted, and reduce the number of comparisons that need to be made, all of which contribute to faster processing time and reduced computing resources.

Additionally, in another embodiment of re-associating a user with a user account using gait analysis, the stored gait signature can be generated as the user walks around the store prior to the confusion event, rather than through a previously conducted formal enrollment process. Specifically, when the initial verification token presented by the user is validated 702, and the user is associated with a user account 704, sensor data representing the user walking may begin to be recorded and continue to be recorded as the user walks about the location. A gait signature is generated from the sensor data and saved as the stored gait signature associated with the user account. Thus, when the confusion event is detected 708, the detected gait signature can be matched to the recently stored gait signature which is associated with the user account. In certain such embodiments, the stored gait signature may be deleted after the user leaves the store or after an amount of time. Alternatively, such an embodiment can serve as a passive enrollment period.

Figure 8:
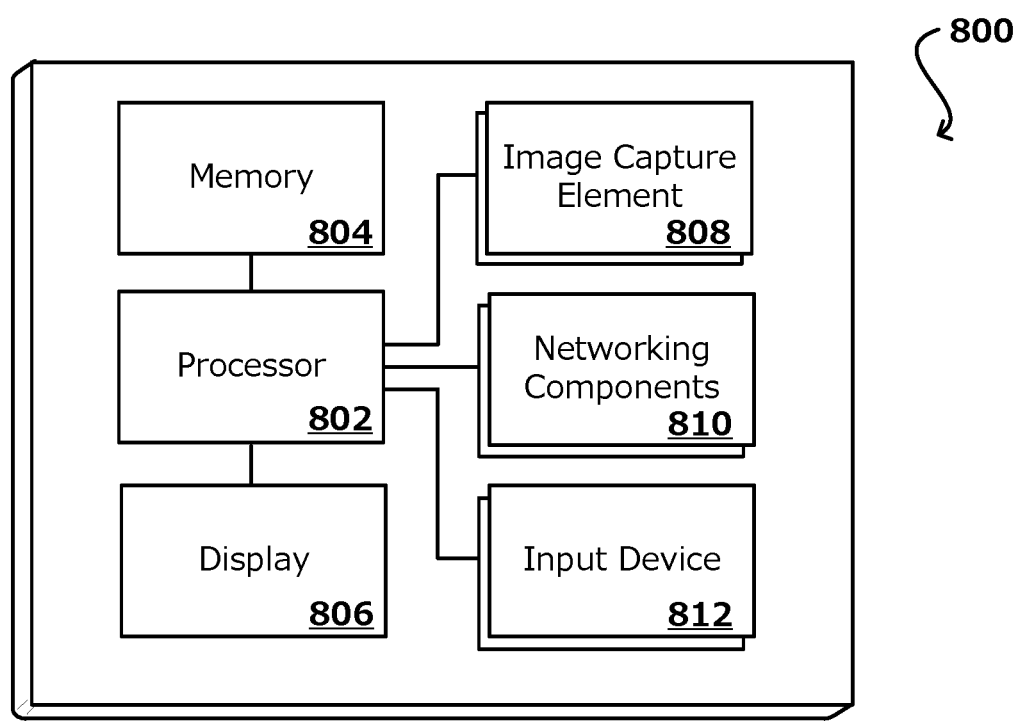
FIG. 8 illustrates components of an example computing device that can be used to implement aspects of various embodiments.

FIG. 8 illustrates a set of basic components of a computing device 800 on which the presently disclosed techniques may be carried out. Specifically, in an embodiment, the resource provider 304 of FIG. 3 may be implemented on computer device 800. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device typically will include at least one type of display element 806, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 808, such as at least one image capture element positioned to determine a relative position of a viewer and at least one image capture element operable to image a user, people, or other viewable objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include at least one motion and/or orientation determining element 810, such as an accelerometer, digital compass, electronic gyroscope, or inertial sensor, which can assist in determining movement or other changes in orientation of the device. The device can include at least one additional input device 812 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 9:
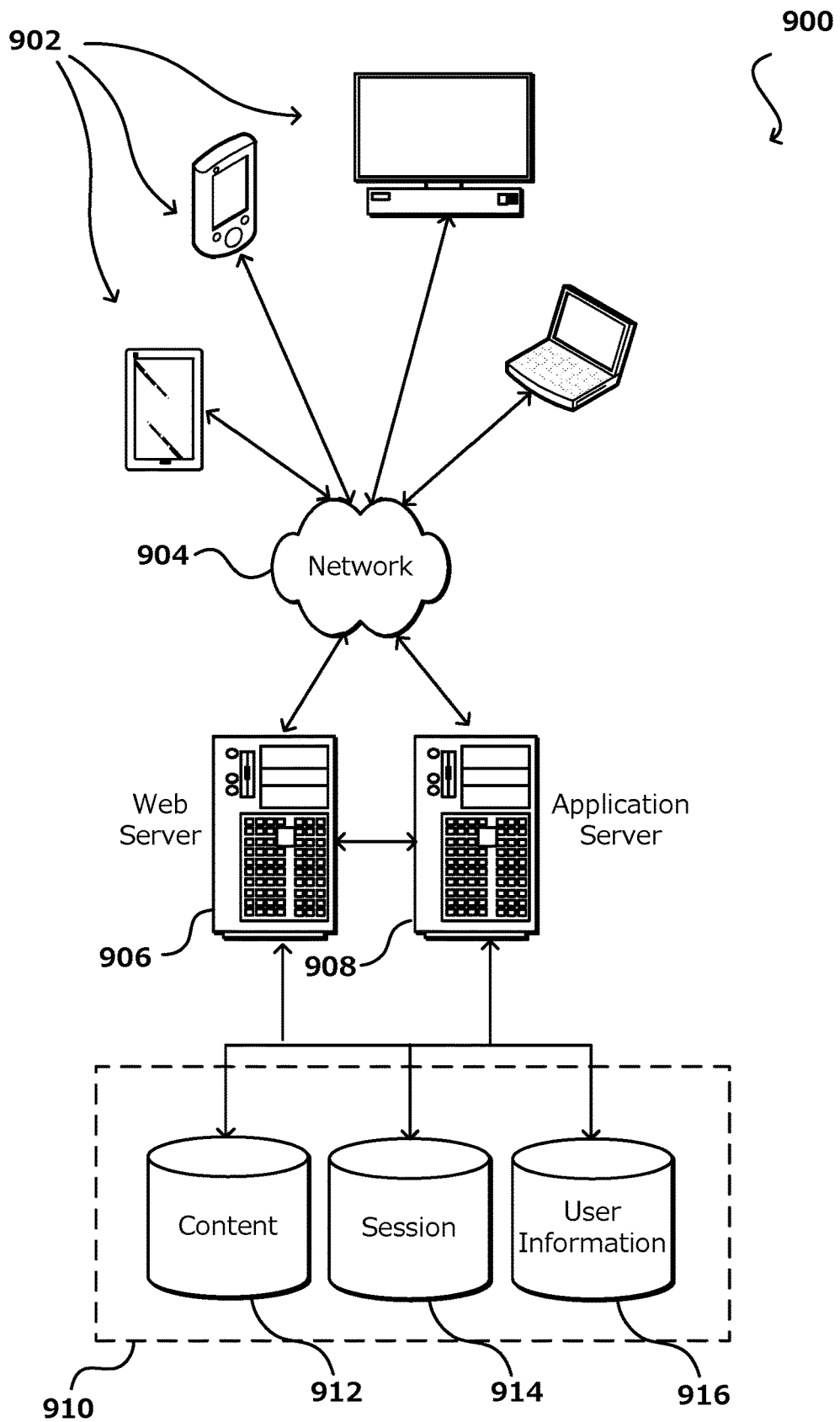
FIG. 9 illustrates an example environment in which aspects of various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices will also typically include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, including storage media and other non-transitory media, such as, but not limited to, volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
obtaining image data from a camera view of a customer, the image data including a representation of the customer;
applying a computer vision technique to the image data to determine an identifier associated with the customer, the identifier also associated with a customer account provided by a resource provider;
applying a gait recognition technique to the image data to determine a detected gait signature associated with the customer;
matching the detected gait signature to a stored gait signature within a predetermined error margin, the stored gait signature associated with a user account;
enabling access to the customer account;
detecting a confusion event, the confusion event unassociating the customer and the customer account;
receiving sensor data including a representation of the customer walking;
applying the gait recognition technique to the sensor data to determine the detected gait signature associated with the customer;
matching the detected gait signature to the stored gait signature within the predetermined error margin, a search scope for matching the detected gait signature limited to stored gait signatures associated with recently active customer accounts obtained from respective physical alternative identity verification tokens, and a first number of features used for matching the detected gait signature being less than a second number of features used for matching the detected gait signature before the confusion event;
determining an action performed by the customer with respect to an item located in a physical store;
triggering an event in the customer account upon determining the action performed by the customer;

debiting the customer account an amount for the item upon detecting the customer exiting the physical store with the item; and deleting the detected gait signature after the customer leaves a defined area associated with the sensor data.

2. The computer-implemented method of claim 1, further comprising:

obtaining enrollment image data, the enrollment image data including a representation of movement of the customer as the customer is walking;

associating the customer to the customer account via an identity verification token;

applying the gait recognition technique to the enrollment image data to determine an enrollment gait signature;

associating the enrollment gait signature with the customer account; and saving the enrollment gait signature as the stored gait signature, the stored gait signature associated with the customer account.

3. The computer-implemented method of claim 1, wherein applying the computer vision technique further includes:

analyzing the image data to determine a feature vector associated with the customer;

comparing the feature vector to a plurality of stored feature vectors; and determining a stored feature vector from the plurality of stored feature vectors that matches the feature vector to at least a threshold deviation, the stored feature vector associated with the identifier.

4. The computer-implemented method of claim 1, where applying the gait recognition technique further includes:

pre-processing the image data for feature extraction;

extracting one or a plurality of gait features from the image data; and combining the one or plurality of gait features to generate the detected gait signature.

5. A system, comprising:

at least one processor; and memory storing instructions that, when executed by the at least one processor, cause the system to:

receive, after an initial physical identity identify verification event, sensor data that includes a first representation of a user walking;

enable access to a user account;

determine a first detected movement signature for the user from the sensor data;

store the first detected movement signature associated with the user and associate the user with the user account;

detect a confusion event, the confusion event unassociating the user and the user account;

receive second sensor data that includes a second representation of the user walking;

determine a second detected movement signature for the user from the second sensor data;

match the second detected movement signature to the first detected movement signature within a predetermined error margin, the search scope for matching the second detected movement signature limited to stored movement signatures associated with recently active user accounts obtained from respective physical alternative identity verification tokens, and a first number of features used for matching the second detected movement signature being less than a second number of features used for associating the first detected movement signature before the confusion event;

enable access to the user account;

trigger an event in the user account in response to detecting a user action; and delete the first detected movement signature after the user leaves a defined area associated with the sensor data.

6. The system of claim 5, wherein the sensor data comprises image data obtained from a camera view of the user walking.

7. The system of claim 5, wherein the instructions when executed further cause the system to:

detect the user entering or exiting a specified location or boundary, or detect the user picking up or putting down an item as the user action.

8. The system of claim 5, wherein the event triggered in the user account comprises at least one of: logging the user action, debiting the user account an amount associated with the user action, or producing a notification corresponding to the user action.

9. The system of claim 5, wherein the instructions when executed further cause the system to:

verify an association between the user and the user account through the respective physical alternative identity verification token.

10. The system of claim 9, wherein the instructions when executed to verify the association between the user and the user account through the identity verification token further cause the system to:

obtain image data from a live camera view of the user, the image data including a representation of the user; and apply a computer vision technique to the image data to determine an identifier associated with the user, the identifier also associated with the user account.

11. They system of claim 9, wherein the respective physical alternative identity verification token comprises at least one of: a facial recognition identifier, a barcode, a password, a smartcard, or an identification card.

12. The system of claim 5, wherein the instructions when executed further cause the system to:

store the second detected movement.

13. The system of claim 5, wherein the instructions when executed further cause the system to:

obtain enrollment sensor data, the enrollment sensor data including a representation of movement of the user as the user is walking;

associate the user to the user account via an identity verification token;

apply a gait recognition technique to the enrollment sensor data to determine an enrollment movement signature;

associate the enrollment movement signature with the user account; and save the enrollment movement signature as a stored movement signature, the stored movement signature associated with the user account.

14. The system of claim 5, wherein the instructions when executed further cause the system to:

receive sensor data that includes a representation of a secondary user associated with the user or the user account; and trigger an event in the user account in response to detecting a secondary user action.

15. The system of claim 5, wherein the instructions when executed further cause the system to:

receive, at a resource provider, the sensor data from a sensor located at a physical store; and enable access to the user account, the user account administered by the resource provider or an authorized personal associated with the physical store.

16. A computer-implemented method, comprising:

receiving, after an initial physical identity identify verification event, sensor data that includes a representation of a user walking;

enabling access to a user account;

determining a first detected movement signature for the user from the sensor data;

storing the first detected movement signature associated with the user and associate the user with the user account;

detecting a confusion event, the confusion event unassociating the user and the user account;

receiving second sensor data that includes a second representation of the user walking;

determining a second detected movement signature for the user from the second sensor data;

matching the second detected movement signature to the first detected movement signature within a predetermined error margin, the search scope for matching the second detected movement signature limited to stored movement signatures associated with recently active user accounts obtained from respective physical alternative identity verification tokens, and a first number of features used for matching the second detected movement signature being less than a second number of features used for associating the first detected movement signature before the confusion event;

enabling access to the user account;

triggering an event in the user account in response to detecting a user action; and deleting the first detected movement signature after the user leaves a defined area associated with the sensor data.

17. The computer-implemented method of claim 16, wherein the sensor data comprises image data obtained from a camera view of the user walking.

18. The computer-implemented method of claim 16, wherein detecting the user action comprises detecting the user entering or exiting a specified location or boundary, or picking up or putting down an item as the user action.

19. The computer-implemented method of claim 16, wherein the event triggered in the user account comprises at least one of: logging the user action, debiting the user account an amount associated with the user action, or producing a notification corresponding to the user action.

20. The computer-implemented method of claim 16, further comprising verifying an association between the user and the user account through the respective alternative physical identity verification token.

* * * * *